United States Patent [19]
Voogt et al.

[11] Patent Number: 5,897,688
[45] Date of Patent: Apr. 27, 1999

[54] METHOD OF REMOVING A METAL FROM A STREAM OF HOT GAS

[75] Inventors: Nicolaas Voogt, Ta Beekbergen; Joseph Jan Peter Biermann, Ah Huis Ter Heide, both of Netherlands

[73] Assignee: CDEM Holland, BV, Doelinchem, Netherlands

[21] Appl. No.: 08/844,268

[22] Filed: Apr. 18, 1997

[51] Int. Cl.⁶ .................................................. B01D 53/04
[52] U.S. Cl. .............................. 95/133; 423/89; 423/108; 423/210
[58] Field of Search ................ 95/133, 134; 423/89, 423/99, 107, 108, 210, 244.05

[56] References Cited

U.S. PATENT DOCUMENTS 4,065,544  12/1977  Hamling et al. ...................... 423/99 X

FOREIGN PATENT DOCUMENTS

| | | |
|---|---|---|
| 1005929A3 | 3/1994 | Belgium . |
| 0412591 | 2/1991 | European Pat. Off. ................. 95/133 |
| 3919124 | 1/1990 | Germany ................................. 95/133 |
| 52-007871 | 1/1977 | Japan ....................................... 95/133 |
| WO96/06057 | 2/1996 | WIPO . |

*Primary Examiner*—Robert Spitzer
*Attorney, Agent, or Firm*—Wolf, Greenfield & Sacks, P.C.

[57] ABSTRACT

The present invention relates to a method of removing a metal from a stream of hot gas, wherein a particulate material comprising calcium and aluminum-silicate is contacted in the hot gas to absorb metal present in the hot gas. According to the invention, a meta-kaolin-containing substance is introduced in the hot gas, said meta-kaolin-containing substance being formed by thermally converting a material chosen from the group of I) waste paper, and ii) residue from the paper industry. The invention may be used to remove metals before, during or after the combustion or gasification of fossil fuels, biomass and organic waste.

20 Claims, 2 Drawing Sheets

METHOD OF REMOVING A METAL FROM A STREAM OF HOT GAS

BACKGROUND OF THE INVENTION

The present invention relates to a method of removing a metal, in particular a heavy metal, from a stream of hot gas, wherein a particulate material comprising calcium and aluminum-silicate is contacted with the hot gas containing metal in the gaseous phase, which particulate material adsorbs the metal.

Such a method is known in the art, for example for the cleansing of flue gas released during the combustion of coal. A mixture of calcium hydroxide particles and kaolin (an aluminum silicate) particles is introduced in the hot flue gas to adsorb a metal present, such as lead or nickel. The mixture is a physical mixture. Special care is taken to use particles as small as possible. High-grade kaolin, characterized by its small particle size, is used to obtain optimum performance. Kaolin is the compound actually adsorbing the metal. The function of calcium hydroxide is to scavenge negatively charged ions such as sulfate and chloride, which have an adverse effect on the performance of the kaolin.

This method has several disadvantages. Firstly, the starting materials, and in particular kaolin, are expensive. Furthermore, virgin kaolin is a finite natural resource. Secondly, extremely fine grinding and/or the use of precipitation techniques adds to the cost.

The object of the present invention is to alleviate the above mentioned disadvantages.

SUMMARY DISCLOSURE OF THE INVENTION

To this end, the method according to the present invention is characterized in that a meta-kaolin-containing substance is contacted with the hot gas, said meta-kaolin- containing substance being formed by thermally converting a material chosen from the group of i) waste paper, and ii) residue from the paper industry.

The meta-kaolin-containing substance has several interesting properties. Firstly, more than 80% by weight of the particles has a diameter of more than 2 micron, making the particles easily retrievable, for example by using a cyclone or, when the gas has cooled down, a cloth filter. Secondly, each particle is a porous particle, and is an intimate mixture of calcium hydroxide and meta-kaolin. Depending on the way they were obtained, the particles also contain calcium carbonate and some calcium oxide, as described in WO96/06057 and the U.S. Patent Application designating priority to WO96/06057 (hereinafter referred to as WO96/06057), which is hereby incorporated by reference. In a single meta-kaolin-containing particle, the calcium compounds and the meta-kaolin were spatially indistinguishable when using an element-sensitive electron microscopic technique (EDX) to detect calcium, aluminum and silicon, which indicates that the meta-kaolin-containing particle is comprised of domains of calcium compounds and meta-kaolin which are smaller than the particles of mixtures of calcium compound and kaolin according to the state of the art. In other words, the average distance between calcium compound and meta-kaolin is smaller. Thus, any meta-kaolin surface is always near a domain capable of scavenging negatively charged ions, which should allow for improved performance. Finally, being derived from a waste product from the paper industry, it is cheaper.

The Belgian patent 1,005,929 describes a method of preparing an artificial puzzolanic product from deinking paper sludge. It is disclosed that heavy metals originally present in the deinking paper sludge are present in the final product in an immobilized form and do not contribute to the pollution of the environment. There is no suggestion that the final product is capable of adsorbing metal, and more in particular that it can be applied for adsorbing substantial (additional) amounts of metal, including metals which are not present in deinking sludge.

The method according to the present invention may be used for the removal of metals from flue gas resulting from the combustion or gasification of coal, oil, biomass or other organic matter such as organic waste. Non-limiting examples of toxic waste are wood impregnated with biocidal copper, chrome or arsenic salts, plastics containing inorganic dyes such as cadmium-based dyes, and metal-comprising combat gasses.

Generally, the meta-kaolin-containing substance will be introduced in hot gas having a temperature between 850° C. and 1400° C. In case of gasification, the meta-kaolin-containing substance may be introduced before, during or after combustion of the gas formed during gasification, and may be subjected to higher temperatures.

If the meta-kaolin-containing substance is subjected to a temperature of approximately 1000° C. or higher, any calcium carbonate in the substance decomposes, as a consequence of which a meta-kaolin-containing particle breaks up into a plurality of smaller particles. This decreases the average distance between the particles and increases the efficiency with which metal is adsorbed from the hot stream of gas. It is believed this is due to a better accessibility of the metals in the gas.

Advantageously, a meta-kaolin-containing substance is introduced with at least 90% by weight of the particles having a diameter of at least 2 $\mu$m and at a temperature of less than 1000° C.

Thus the majority of the particles can easily be retrieved using conventional techniques for dust removal. Conveniently, cyclones and cloth filters can be used for this purpose.

Preferably, the meta-kaolin-containing substance contacted with the hot gas is formed in a fluidized bed.

DETAILED DESCRIPTION OF THE INVENTION

Figure 1:
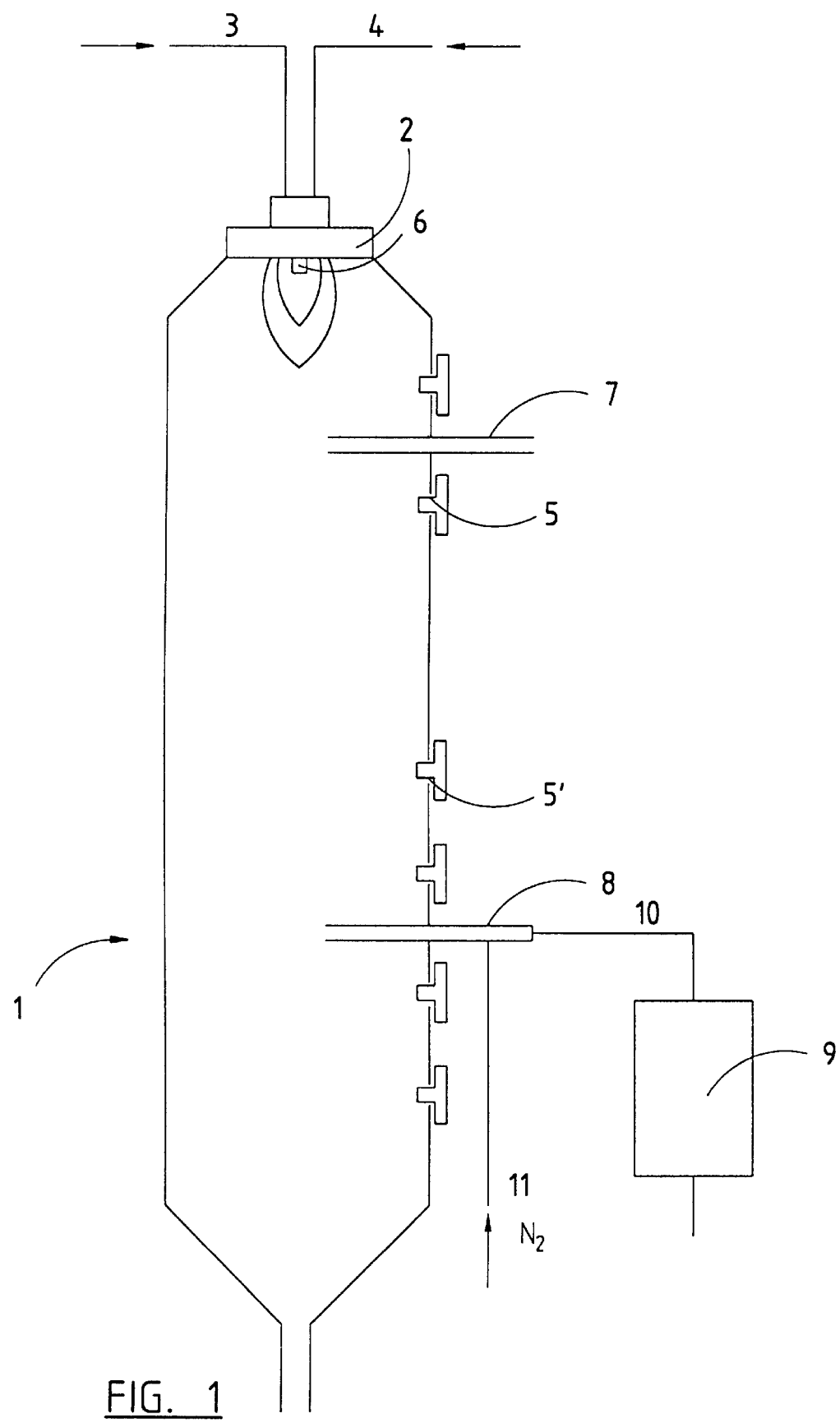
FIG. 1 is a schematic cross-sectional view of an experimental reactor.

A meta-kaolin-containing substance formed in a fluidized bed proved to be very suitable for the cheap and easy removal of metals from a stream of hot gas. The method of obtaining a meta-kaolin-containing substance in a fluidized bed is disclosed in WO96/06057, which is incorporated herein by reference.

In accordance with WO96/06057, the temperature in the freeboard of the fluidized bed is kept below 850° C., and preferably below 800° C.

A meta-kaolin-containing substance obtained in this manner has hydraulic (and puzzolanic) properties which are useful when the substance, after being used for the removal of metal from a stream of hot gas, is used as an active component for the manufacture of cement or a concrete product, immobilizing any metal present. In addition, decomposition of calcium carbonate present in the meta-kaolin-containing substance is prevented, which prevents break-up in this stage, facilitating handling of the meta-kaolin-containing substance.

According to a preferred embodiment, particles having a diameter of at least 0.5 mm are used in a reactor chosen from the group consisting of a fluidized bed reactor and a fixed bed reactor.

Such large substance particles, which may have a diameter of 2.5 mm and more, can be obtained using the process described in WO96/06057, which process is incorporated herein by reference. It is believed that the porous nature of such substance and its large particle size, causes that metal to be removed using fluidized bed reactor and fixed bed reactor systems, surprisingly allowing for the application of reactor techniques that previously were not feasible for metal removal from hot gaseous streams.

Substance particles having a diameter of at least 0.5 mm comprising a core, preferably a grain of sand, may be used, said core being coated with flue material, in a reactor chosen from the group consisting of a fluidized bed reactor and a fixed bed reactor. Using sand with a diameter of 0.5–1.0 mm as a heat transfer agent in the process described in WO96/06057, the grains of sand reaches diameters of 2.5 mm and more. Although sand is a preferred core material in view of its low cost, other core materials are conceivable, such as alumina.

Particulate material comprising adsorbed metal resulting from the method according to the present invention, may be used as a filler, which possibly may still possess some puzzolanic and hydraulic activity, for the manufacture of cement and concrete products, thus immobilizing the adsorbed metals permanently. That is, the adsorbed metals cannot leach from the cement or concrete product to any significant extent.

The metals adsorbed are usually heavy metals, in particular metals chosen from, but not limited to, the group of lead, cadmium, nickel, and arsenic.

It is conceivable that the method according to the present invention could be used to provide a material having catalytic activity.

The invention will be elucidated with reference to the following, non-limiting examples and drawings.

EXAMPLE I

Removal of Lead

To demonstrate the removal of a heavy metal, here lead, from a hot gaseous stream, a reactor 1 (FIG. 1) is used comprising a burner 2 to which natural gas and air is supplied through pipe 3 and 4 respectively. Downstream from the burner 2, the reactor 1 having a length of 5 m and an inner diameter of 15 cm, is provided with a number of closable openings 5 through which metal-adsorbing particulate material is supplied and particulate material comprising adsorbed metal is removed. An opening 5 for the supply or removal of particulate material is selected depending on the desired temperature at which it is desired to supply or remove particulate material, said temperature being dependent on the distance to the burner 2.

Adsorbing particulate material was introduced through a nozzle 7, inserted in an opening 5, in the reactor 1 at a rate of 2 g per minute. Under the conditions applied, particles remain up to 3.5 seconds in the hot gaseous stream.

Air is used to atomize an aqueous solution of 30 gr lead acetate trihydrate per liter using air a jet-airblast atomizer (not shown). The atomizer discharges 0.5 g Pb per minute via a nozzle 6 directly into a flame formed by combustion of natural gas and a load of 14 kW in the furnace. Oxygen is supplied in an 20% stoichiometric excess. The concentration of lead in the stream is approximately 100 times higher than that in practice, for example when coal is used as a fuel.

A cooled sampler 8 is used to withdraw a sample of the gaseous stream isokinetically. The sample is diluted 20 fold using nitrogen gas supplied to sampler 8 through pipe 11 before being fed through pipe 10 to an Anderson Cascade Impactor 9, an inertial separation device which is known in itself.

The experimental set-up described suffers from loss of heavy metal, i.e. lead, introduced, essentially due to condensation of lead on the inner wall of the reactor 1, which problem is aggravated due to the small size of the reactor 1 in comparison to a practical reactor for the combustion of, for example, coal. For this reason, concentrations of lead are expressed relative to the total amount of lead in the particles retrieved.

The concentration of lead in the particles was measured by atom absorption spectroscopy preceded by acidic dissolution of the metals.

Figure 2:
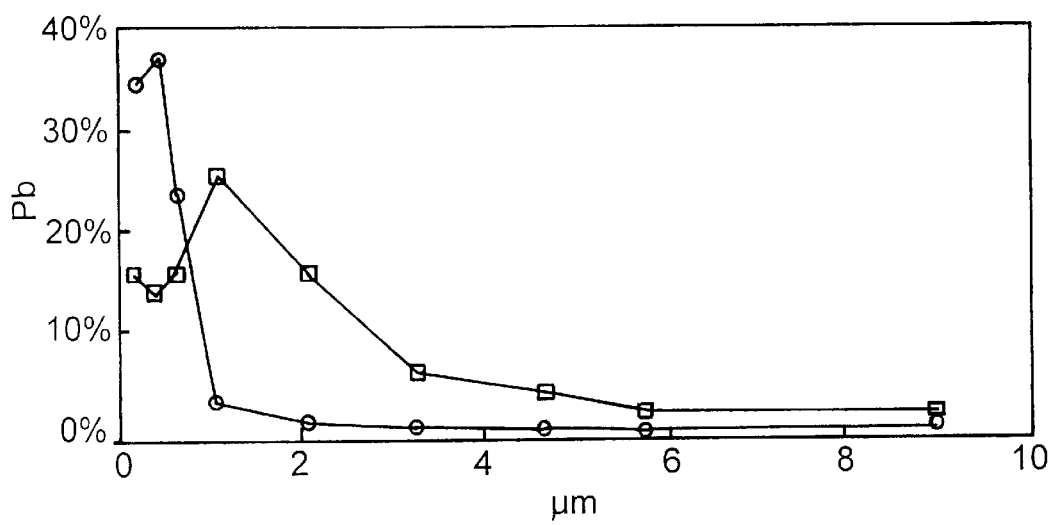
FIG. 2 is graph showing the experimental results of an experiment on the removal of lead, wherein the lead concentration is plotted versus particle size.

FIG. 2 is a graphical representation of the results from experiments, depicting the concentration of lead versus the particle size. The line connecting open circles indicates the results obtained from a comparative experiment in which no adsorbing particulate material is supplied to a nozzle 7. Sampling is performed isokinetically through a cooled sampler 8 at a temperature in the reactor 1 of 600° C. To this end, the sampler 8 was inserted into a closable opening 5, capable of being closed by a removable seal, selected a distance from the burner 2 where the hot gas has a temperature of 600° C. Due to the high concentration of lead, lead particles are formed of relatively large size. However, in practice, the lead particles formed, if any, would be difficult to collect.

The line connecting open squares represents the results obtained from an experiment wherein meta-kaolin-containing material is introduced through a nozzle 7 at a rate of 2 g/min in the gaseous stream at a temperature of 1080° C. It can clearly be seen that the peak of lead particles near about 0.5 $\mu$m in absence of adsorbing particulate material (open circles) disappears when the meta-kaolin-containing adsorbing material according to the present invention is added, evidence of adsorption of lead to the adsorbing material.

EXAMPLE II

Removal of Cadmium

An experiment similar to the experiment described in Example I has been conducted using cadmium dihydrate as the heavy metal introduced in the flame. In the absence of adsorbing material, bright yellow cadmium oxide particles were retrieved using the Anderson Cascade Impactor 9, said brightly yellow particles being absent in the presence of meta-kaolin-comprising substance according to the present invention.

We claim:

1. In a method of removing a metal from a stream of hot gas containing metal in the gaseous phase, wherein an aluminum-silicate compound and a calcium compound are contacted with the hot gas containing metal in the gaseous phase to absorb the metal, the improvement comprising using particles containing both calcium and aluminum-silicate to contact the hot gas containing metal in the gaseous phase, said particles comprising meta-kaolin and said particles formed by thermal conversion of a material selected from the group consisting of waste paper and residue from the paper industry.

2. The method of claim 1, wherein the hot gas has a temperature between 850 and 1400° C.

3. The method of claim 1, wherein the particles containing meta-kaolin are contacted with the hot gas having a temperature of at least 1000° C.

4. The method of claim 1, wherein at least 90% by weight of the particles comprising meta-kaolin have a diameter of at least 2 µm and wherein the particles comprising meta-kaolin are contacted with the hot gas at a temperature of less than 1000° C.

5. The method of claim 1, wherein the particles comprising meta-kaolin are formed by thermal conversion in a fluidized bed.

6. The method of claim 5, wherein the fluidized bed has a free board and wherein the free board is kept below 850° C.

7. The method of claim 5, wherein the fluidized bed has a free board and wherein the free board is kept below 800° C.

8. The method of claim 5, wherein the particles comprising a diameter of at least 0.5 mm are used in a reactor selected from the group consisting of a fluidized bed reactor and a fixed bed reactor.

9. The method of claim 5, wherein the particles comprising meta-kaolin have a diameter of at least 0.5 mm and wherein the particles further comprise a core material coated with the meta-kaolin containing material and wherein the particles may be used in a reactor selected from the group consisting of a fluidized bed reactor and a fixed bed reactor.

10. The method of claim 1, wherein the metal is a heavy metal.

11. Metal-containing particles formed by the method of claim 1.

12. Metal-containing particles formed by the method of claim 2.

13. Metal-containing particles formed by the method of claim 3.

14. Metal-containing particles formed by the method of claim 4.

15. Metal-containing particles formed by the method of claim 5.

16. Metal-containing particles formed by the method of claim 6.

17. Metal-containing particles formed by the method of claim 7.

18. Metal-containing particles formed by the method of claim 8.

19. Metal-containing particles formed by the method of claim 9.

20. Metal-containing particles formed by the method of claim 10.

* * * * *